A. HOPKINSON.
APPARATUS FOR MILLING SCREW THREADS.
APPLICATION FILED MAR 28, 1917.
1,292,781.
Patented Jan. 28, 1919.
10 SHEETS—SHEET 3.
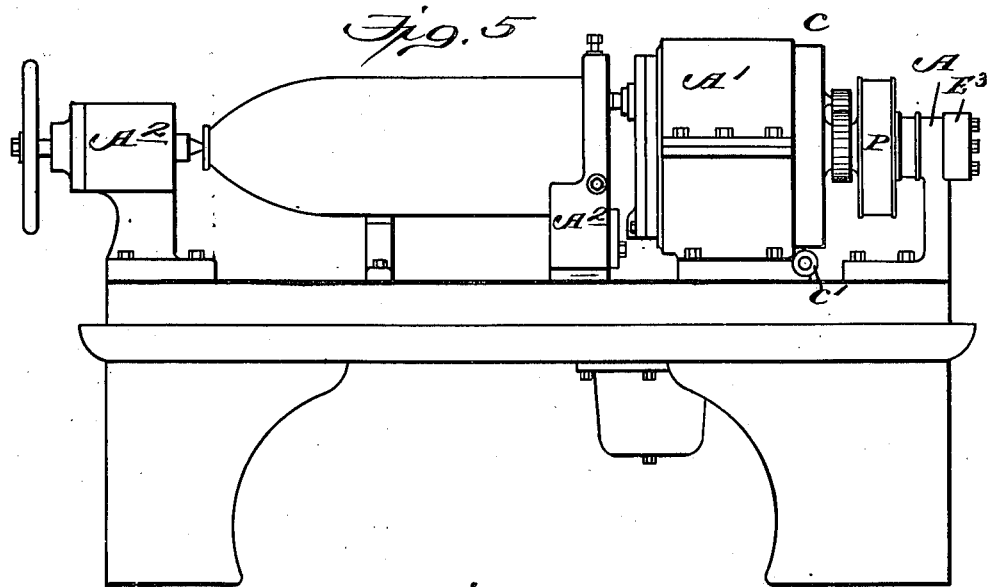
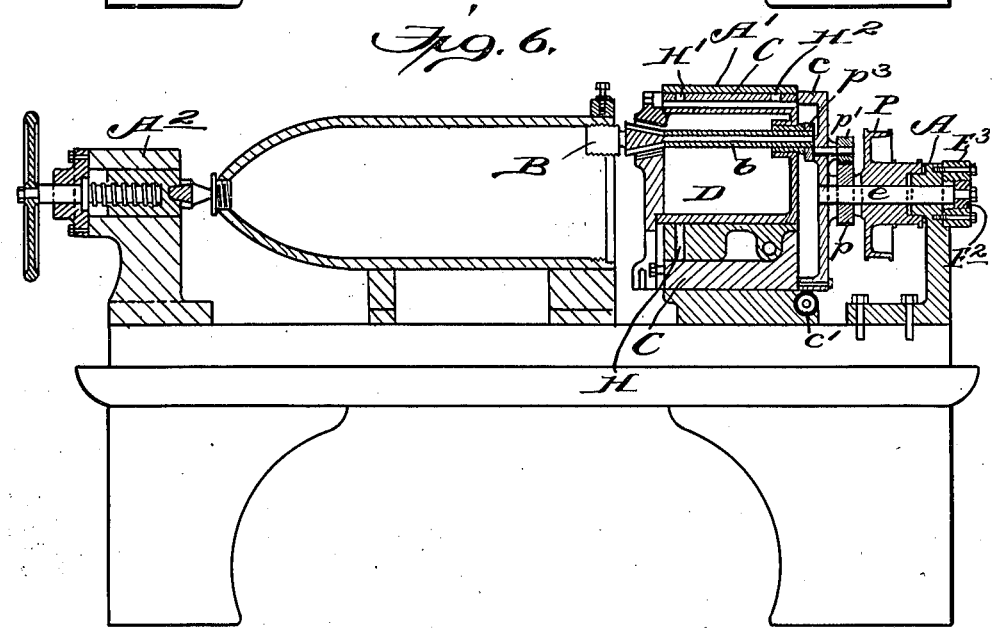
Witnesses:
Inventor
Alfred Hopkinson
Attorney

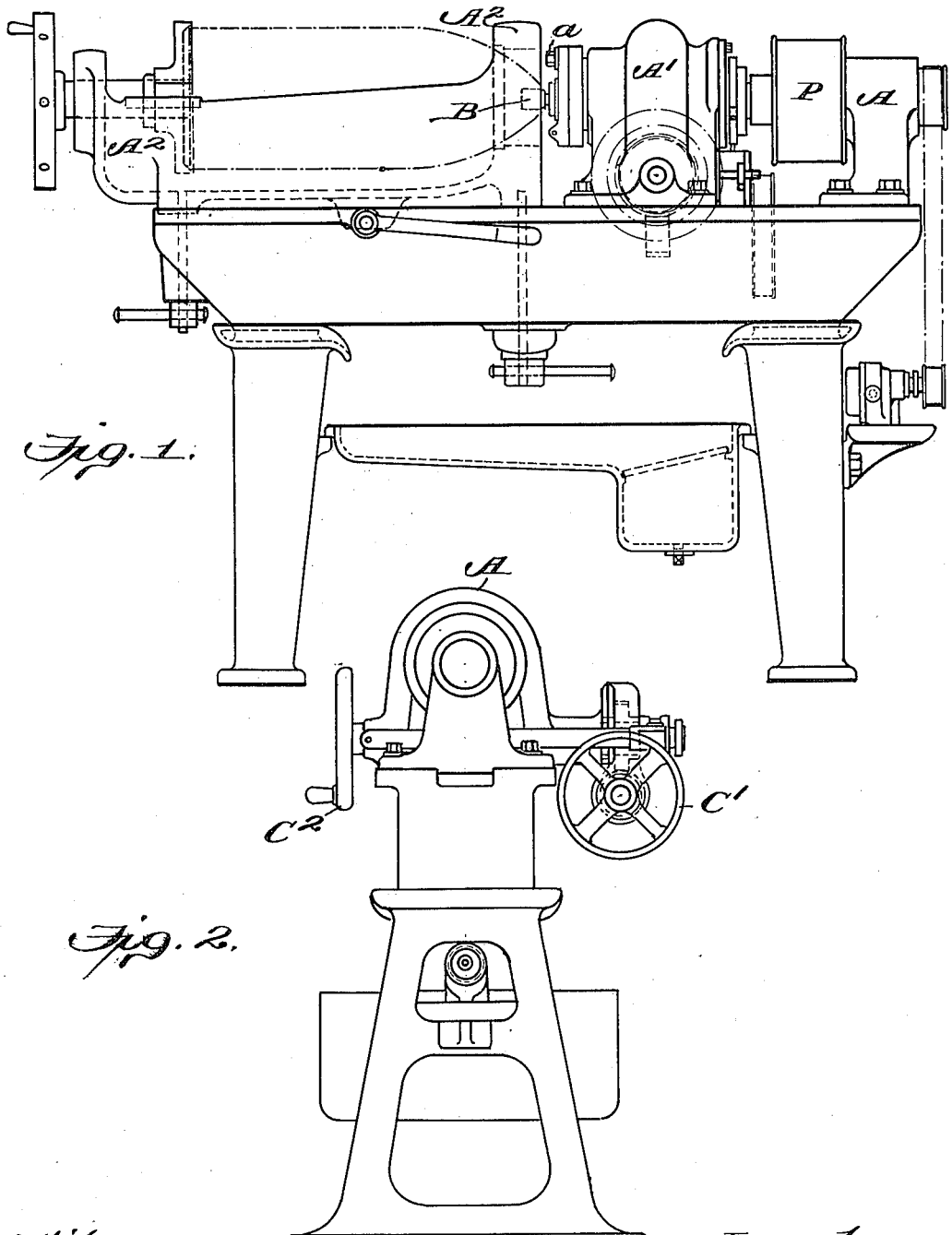

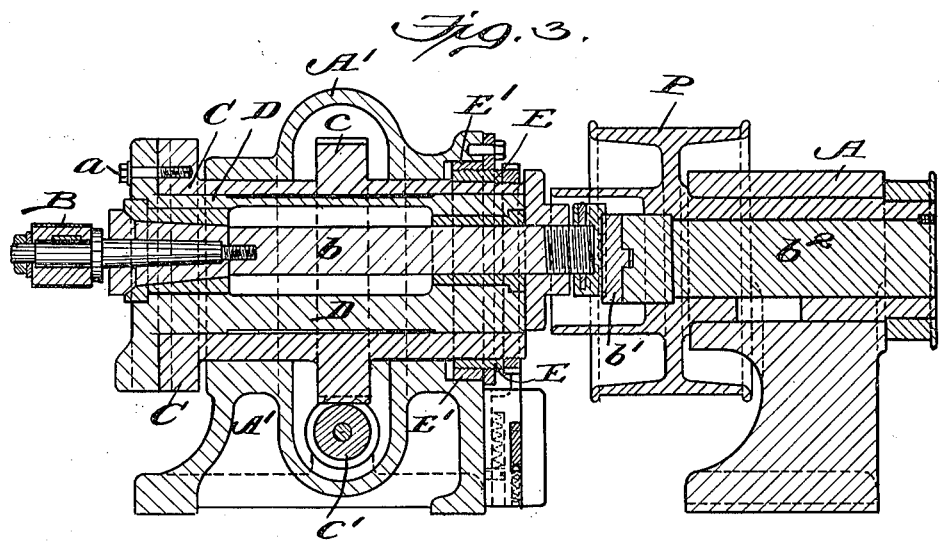
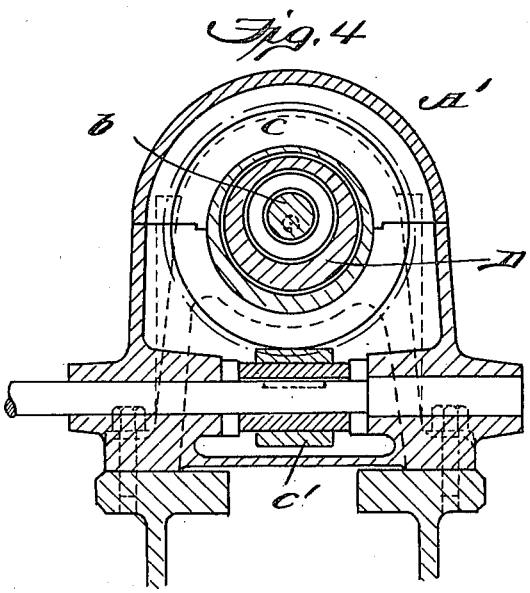

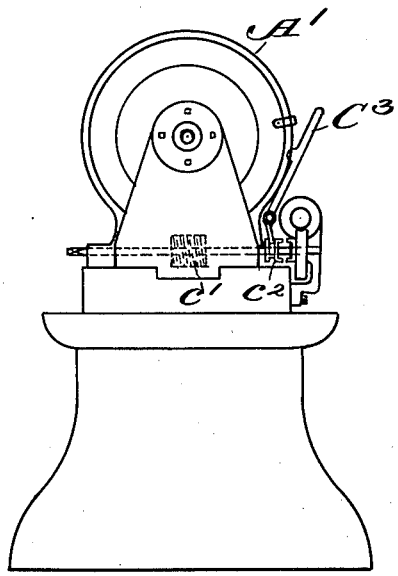

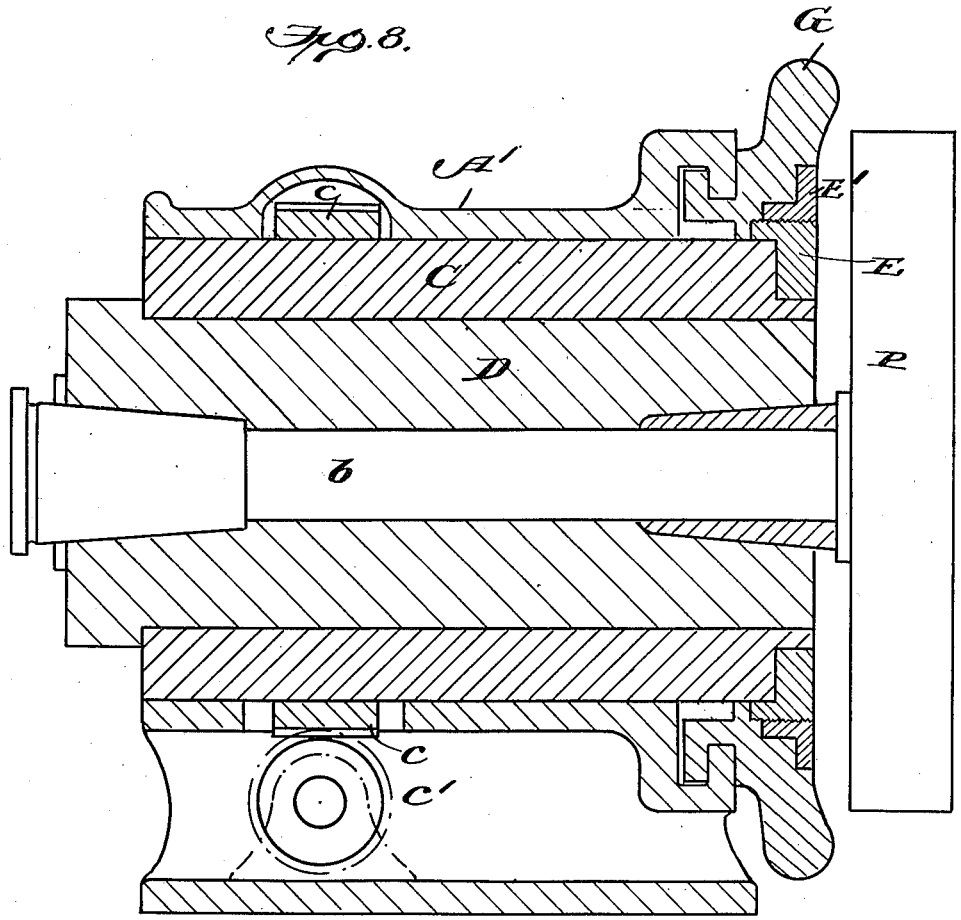

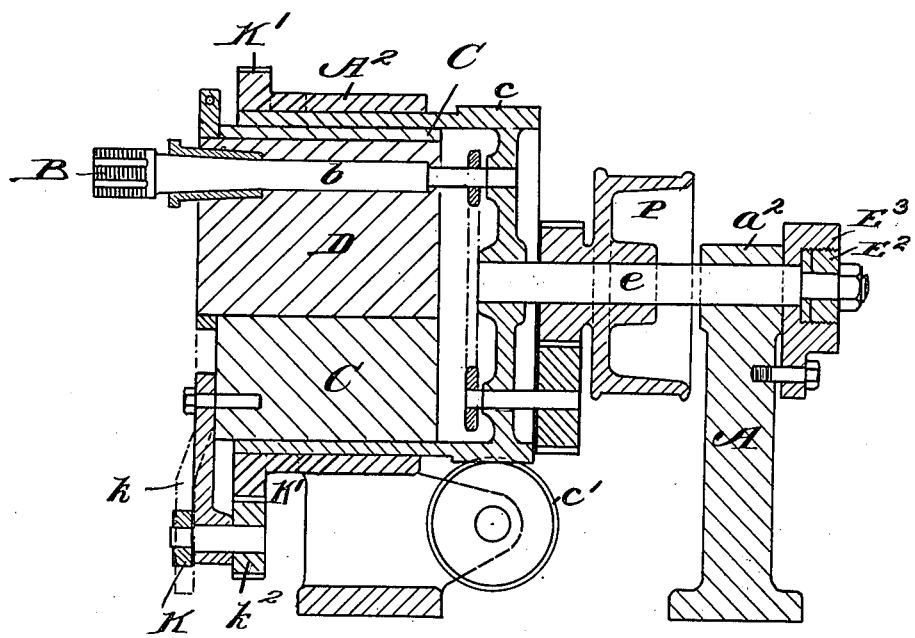

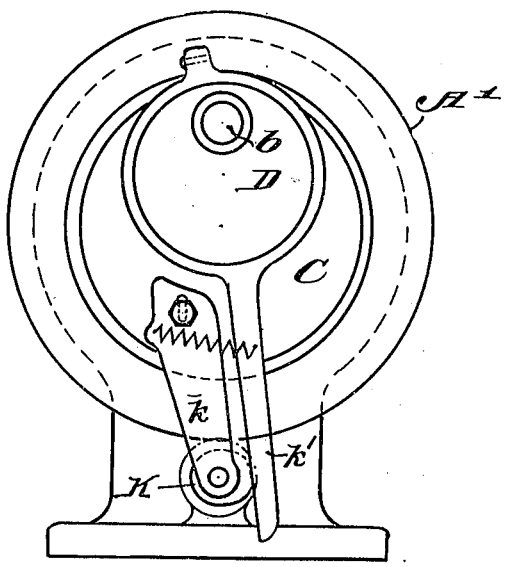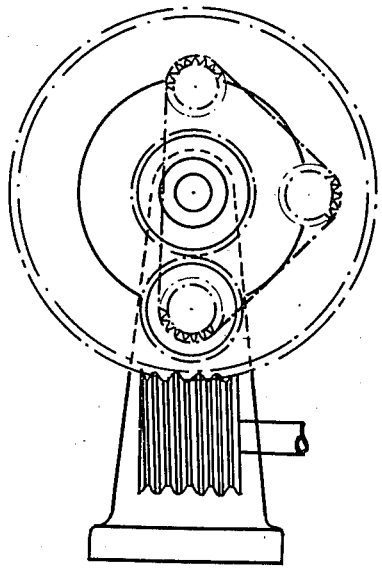

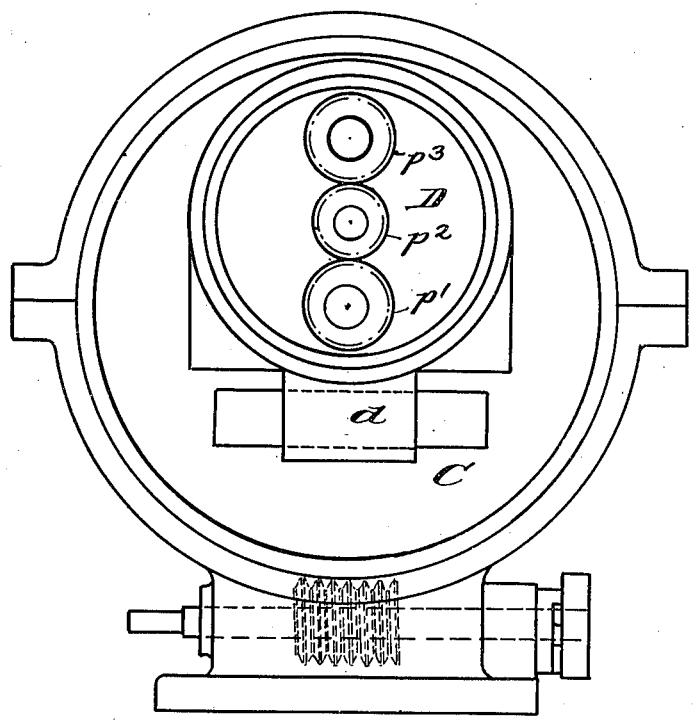

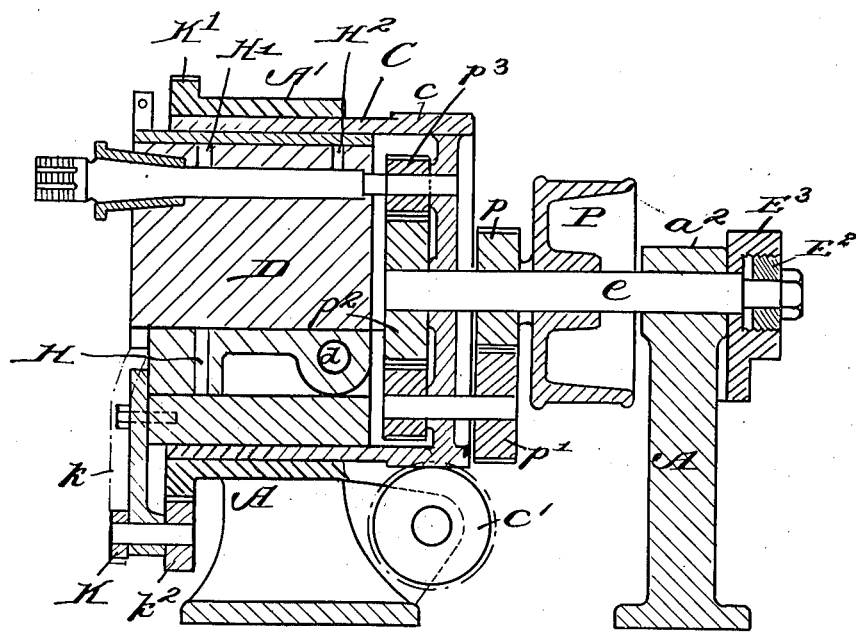

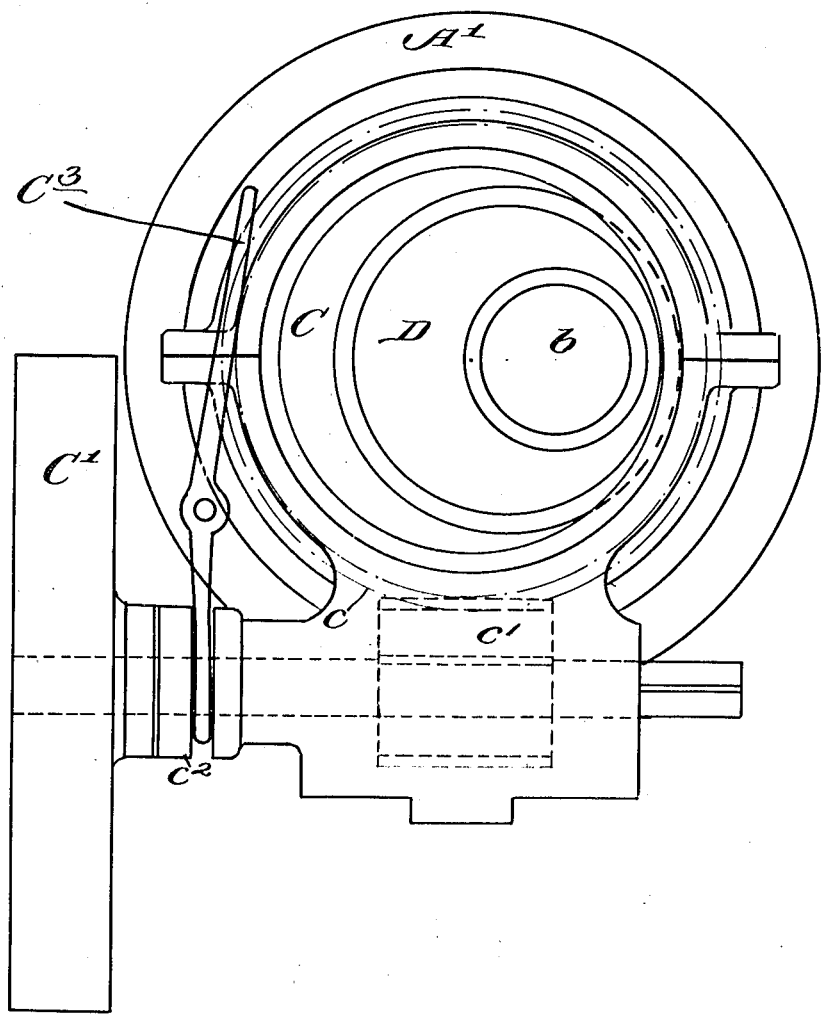

UNITED STATES PATENT OFFICE.

ALFRED HOPKINSON, OF HYDE, ENGLAND.

APPARATUS FOR MILLING SCREW-THREADS.

1,292,781.    Specification of Letters Patent.    Patented Jan. 28, 1919.

Application filed March 28, 1917. Serial No. 158,053.

*To all whom it may concern:*

Be it known that I, ALFRED HOPKINSON, a British subject, residing at Gee Cross, Hyde, county of Chester, England, have invented certain new and useful Improvements in Apparatus for Milling Screw-Threads, of which the following is a specification.

The invention relates to apparatus for milling internal surfaces in which the milling tool is carried on a rotary spindle which is eccentrically or radially adjustable to bring the tool to the surface of the work, the tool having a secondary rotary and longitudinal movement imparted thereto to cause it to traverse the surface of the work.

The invention consists in the particular construction and disposition of the parts which render it especially applicable for milling internal screw threads, said part comprising a cylindrical casing, a rotary cylindrical sleeve fitted within the casing and bored eccentrically, a tool carrier placed eccentrically within the rotary sleeve, a worm or toothed gear affixed to the rotary sleeve by which it is rotated and a screw mounted upon or connected with the sleeve so as to move the latter forward during its rotation.

The invention will be fully described with reference to the accompanying drawings.

Figure 1 is a side elevation of one form of the apparatus.

Fig. 2 is an end elevation.

Fig. 3 is an enlarged detail longitudinal section.

Fig. 4 is a transverse section of Fig. 3.

Fig. 5 is a side elevation of another form of the apparatus.

Fig. 6 is a longitudinal section.

Fig. 7 is an end elevation.

Fig. 8 is a longitudinal section showing a direct drive for the tool spindle.

Fig. 9 is a longitudinal section of another form of the apparatus showing the backing off motion.

Fig. 10 is a front elevation.

Fig. 11 is an end elevation showing a chain drive.

Fig. 12 is an end elevation showing a gear drive.

Fig. 13 is a longitudinal section of a further modified form of apparatus.

Fig. 14 is a front elevation drawn to an enlarged scale.

The apparatus is constructed with a bed of any suitable construction upon which are mounted a head stock A to carry the apparatus and a head stock or cradle $A^2$ to carry and center the work (a projectile being shown in position).

The milling tool B, which is of ordinary form for either cutting screw threads or for plain milling, is mounted on a rotary spindle $b$, and for screw cutting is provided with annular grooves, the widths of which are equal to the pitch of the thread to be cut. The head stock A is formed with a cylindrical casing $A'$ forming bearings for a cylindrical carrier or sleeve C free to rotate therein, and fitted with a worm wheel $c$ gearing with a worm $c'$ by which it is slowly rotated the worm being driven either by a pulley $C'$ or by a hand wheel $C^2$, both of the latter devices being shown in Fig. 2. Instead of a worm and worm wheel other forms of gearing may be employed. The cylindrical carrier C is turned or bored eccentrically to receive an eccentric tool carrier bush D the bearings for which are also eccentric to the periphery of the carrier C. By rotating the bush D within the carrier C the axis of the cutter B and its spindle $b$ are brought nearer to or farther from the center of the cylindrical casing $A'$, and when in the desired position they are locked by a set screw $a$, latch or other locking device. The worm $c'$ is fitted with a clutch $c^2$ and lever $c^3$ by which it can be thrown into and out of action. A forward feed is imparted to the carrier or sleeve C by a screw as it rotates (see Fig. 7.)

In the form shown in Figs. 1 to 4 and 8 a ring E is fitted to the carrier or sleeve C and is provided with a peripheral thread to engage a correspondingly threaded ring or nut $E'$ which may be mounted either on the cylindrical casing $A'$ as in Fig. 3, or on a hand wheel G as in Fig. 8. The pitch of the thread on the ring $E'$ is equivalent to that required on the work and as the said carrier C rotates within the casing $A'$ the carrier C and with it the eccentric carrier D and the milling cutter B are fed forward and when the carrier has rotated one revolution the thread on the work is complete. The milling cutter B and its spindle $b$ are driven by a pulley P direct on the spindle $b$ as in Fig. 8, the belt being kept tight as the position of the spindle alters by a weighted or tension pulley (not shown) pressing against the belt to take up any slack therein, or the spindle $b$ may be driven by universal clutch $b'$ between it and a spindle $b^2$ on which the pulley P is mounted as in Fig. 3.

In the form shown in Figs. 5, 6, 9, and 12 and 13, the cylindrical casing A' is similar to that already described with a worm $c'$ mounted therein to rotate the worm wheel $c$, the worm wheel $c$ being attached by screws or otherwise to the rear of the carrier C. The carrier C is fitted with screws H H' H² by which the inner or eccentric carrier D can be adjusted or canted to compensate for any spring in the cutter B or its spindle.

The inner or eccentric carrier D is constructed in two parts pivoted or hinged at $d$ to allow of the adjustment by the screws H H' H² inserted in the carrier C. At the rear end of the carrier C a spindle $e$ is affixed and to the spindle a screw E² is fitted to rotate with it, engaging in a corresponding threaded ring or nut E³ the nut being fitted to the bearing $a^2$ of the head stock A. The screw E² and nut E³ are removable and replaceable for different pitches of threads to be cut. The pitch of the screw E² is equivalent to that required on the work and as the carrier C rotates within the casing A' it and the milling cutter B are fed forward and when the carrier has rotated one revolution the thread on the work is complete. The milling cutter B and spindle $b$ are driven by a pulley P loose on the spindle $e$ through a train of gears $p$ $p'$ $p^2$ $p^3$.

In any form of the apparatus the cutter spindle may be driven by a flexible shaft or other flexible drive and the eccentric carrier D may be rotated within the carrier C by worm or other gears to give the depth of cut. For cutting taps a centering or supporting device may be applied to the carrier D, and for cutting dies and taps an oscillating movement may be given to the carrier D within the carrier C to effect a relieving or backing off thereon. This is effected by a rotary cam K carried by an arm $k$ on the sleeve C and engaging an arm $k'$ affixed to the carrier D whereby as the cam rotates relative movement of the two is effected and the cutter moved to and from the work. The cam K is rotated by a pinion $k^2$ engaging a stationary toothed wheel K' fixed to the casing A'.

Although primarily designed for cutting internal screw threads in shells the apparatus may be employed for cutting internal recesses, a cutter B of any desired shape being used, or it may be used for tooling or truing internal surfaces, or for cylindrical external surfaces. For plain surfaces it may be used either with or without the feed screws E.

In operation the work is clamped in a stationary holder vise or clamp or other centering device according to the shape or nature of the article, and held stationary, and the head stocks are adjusted to bring the work up to the cutter or the cutter up to the work, the cutter being nearly in contact with the surface, the tool is set in motion and the eccentric carrier D rotated within the carrier C to give the desired depth of cut, the two carriers are then clamped or locked together and the worm $c'$ set in motion thereby rotating the two carriers, and the cutter B travels around the work (either internal or external thereto) until it has completed a revolution, the rotation of the carrier C by means of the screw E rotating within the nut E' giving the desired feed.

What I claim as my invention and desire to protect by Letters Patent is:—

1. An apparatus for milling or cutting internal or external cylindrical surfaces, comprising an internally cylindrical fixed casing, a rotating cylindrical sleeve carrier eccentrically bored and fitted in the casing, a bush rotatably fitted in the sleeve carrier and provided with bearings eccentric to the periphery of the carrier and also having an eccentric bore, a tool spindle fitted in the bore of the bush and having means for rotating the same, means for slowly rotating the cylindrical sleeve carrier, the means for rotating the spindle and carrier being independent, and a screw means for imparting a forward feed movement to the sleeve carrier whereby when the carrier and bush have made one revolution the tool spindle and tool carrier is fed forward a distance equivalent to the pitch of the cut made by the tool on the work during one revolution of the said sleeve and bush.

2. An apparatus for milling or cutting internal or external cylindrical surfaces, comprising an internally cylindrical fixed casing, a rotating cylindrical sleeve carrier eccentrically bored and fitted in the casing, a bush rotatably fitted in the sleeve carrier and provided with bearings eccentric to the periphery of the carrier and also having an eccentric bore, a tool spindle fitted in the bore of the bush and provided with means for rotating the same, means for slowly rotating the cylindrical sleeve carrier, the means for rotating the cylindrical sleeve carrier being independent of the means for rotating the tool spindle, and a screw connected to the sleeve carrier and engaging a fixed nut to feed the said carrier and bush forwardly as they rotate whereby when the carrier and bush have made one revolution the tool spindle and tool carrier is fed forward a distance equivalent to the pitch of the cut made by the tool on the work in one revolution of the said sleeve and bush.

In testimony whereof I have hereunto set my hand in presence of two subscribing witnesses.

ALFRED HOPKINSON.

Witnesses:
  I. OWDEN O'BRIEN,
  GEO. H. O'BRIEN.